United States Patent [19]

Hira et al.

[11] Patent Number: 4,665,294

[45] Date of Patent: May 12, 1987

[54] METHOD OF WELDING ALUMINUM ALLOYS

[75] Inventors: Govind L. Hira, Columbia; Thaddeus A. Osial, Randallstown; Wentworth A. Ernst, Chester, all of Md.

[73] Assignee: Westinghouse Electric Corp., Pittsburgh, Pa.

[21] Appl. No.: 845,091

[22] Filed: Mar. 27, 1986

[51] Int. Cl.$^4$ .............................................. B23K 26/00
[52] U.S. Cl. .......................... 219/121 LD; 219/121 LC
[58] Field of Search ................. 219/121 LC, 121 LD, 219/121 EC, 121 ED; 228/263.17, 198

[56] References Cited

U.S. PATENT DOCUMENTS

| 3,373,482 | 3/1968 | Miller | 228/263.17 X |
| 3,656,226 | 4/1972 | Burne | 228/253 |
| 4,251,709 | 2/1981 | Schumacher | 219/121 ED |
| 4,521,668 | 6/1985 | Osial et al. | 219/121 LC |

FOREIGN PATENT DOCUMENTS

| 0455978 | 4/1949 | Canada | 228/263.17 |
| 0117352 | 9/1984 | European Pat. Off. | 219/121 LD |
| 0065592 | 4/1983 | Japan . | |
| 0030492 | 2/1984 | Japan | 219/121 LD |
| 0012159 | 3/1985 | Japan | 219/121 LD |

OTHER PUBLICATIONS

Schwartz, "Fluxless Brazing Aluminum Alloys", *Modern Metals*, May, 1969, pp. 81, 82, 84 and 86.

*Primary Examiner*—C. L. Albritton
*Attorney, Agent, or Firm*—M. S. Yatsko

[57] ABSTRACT

A method of welding together aluminum alloy workpieces of the same aluminum alloy, and comprises disposing a selected alloying metal on the workpiece in the desired weld area, locally heating the workpieces in the weld area to form a localized liquid solution, and solidifying the localized liquid solution to form the weld between the like aluminum alloy workpieces. The selected alloying metal is silicon for aluminum alloys of interest, and a laser is the preferred heating means for effecting the welding.

14 Claims, 7 Drawing Figures

METHOD OF WELDING ALUMINUM ALLOYS

BACKGROUND OF THE INVENTION

The present invention relates to a method of welding together aluminum alloy workpieces of the same aluminum alloy. The welding is carried out by depositing a selected alloying metal at the workpiece interfacing the weld area and locally heating the workpiece in the weld area forming a localized liquid solution and subsequent solidified high strength weld seam. The localized heating of the workpiece can be carried out using a laser or an electron beam or other such localized heating means.

In the manufacture of electrical systems, such as radar systems, numerous electronic packages must be hermetically sealed. These electronic packages are typically box-like with radio frequency connections sealed through the package or module walls. Electronic components such as hybrid microwave circuitry are mounted within the package which is hermetically sealed by soldering in place a top or bottom cover member. It has been common to solder-seal such electronic packages but this requires heating the entire package, which is typically aluminum or a selected aluminum alloy, to a temperature which may adversely affect the electronic components within the package.

It is also not unusual for such electronic packages to be reopened or delidded during assembly and testing for adjustment or replacement of defective electronic components. In such a repair or rework operation, the package must be disassembled by removal of the cover which requires reheating of the solder-seal to permit removal of the cover member. Following replacement or repair of the electronic component, the cover then would be solder-sealed back onto the package to complete assembly.

The laser welding of aluminum workpieces or packages has proven to be a highly desirable fabricating process for many applications, such as in airborne electronic subsystem structures or packages containing electronic components, wherein hermetic sealing is required for hybrid microelectronics, radio frequency signal processing modules, power hybrid packages, and other similar electronics packages. The primary advantages of laser welding are the relative ease of automation of the process with the attendant lower cost of fabrication, and the minimization of heat transferred to the electronic components during the laser welding process. Appropriate design of the weld joint configuration also allows repetitive opening and rewelding of the module lid or cover to provide for rework of the electronic components contained within the package.

The fabrication of phase array radar antenna structures and microwave waveguide manifolds is particularly difficult using conventional welding techniques. Such structures involve very tight tolerances of machining dimensions for the pieces which are to be joined, and this joining must be effected with minimal thermal distortion. The welding process of the present invention with its highly localized heating of the weld joint, and use of the wave selected aluminum alloy is particularly advantageous for fabricating such radar antenna systems.

The preferred aluminum package material from a structural standpoint for the housing and covers of an electronic package is 6061 aluminum alloy which has many highly desirable structural properties and is very easily machined for fabricating ease. This alloy which contains 0.6% silicon, 1% magnesium, and 0.3% copper, however, shows a marked tendency to crack in the weld area where the joint components or workpieces are both 6061 aluminum alloy. It has been the practice in joining 6061 aluminum alloy workpieces together to utilize a filler material such as 4047 aluminum alloy which is typically available as welding rod or shim stock, or to use the 4047 alloy as a cover member to effectuate the hermetic sealing of the 6061 alloy component. The 4047 aluminum alloy contains about 12% silicon and when the 4047 alloy is locally heated to form a weld, it results in a nominal silicon concentration of typically about 2 to 5% in the weld area which is known to be a high strength non-cracking weld. The 4047 aluminum alloy has a flexural modulus and hardness characteristic which are significantly below the desired characteristics exhibited by 6061 aluminum alloy.

U.S. Pat. No. 4,521,668, owned by the assignee of the present invention, teaches laser welding a 4047 aluminum alloy cover member to a 6061 aluminum alloy electronics package to effectuate hermetic sealing of the aluminum electronics package. This patent teaches that the laser sealing fabrication process minimizes heating of the electronics components within the package during sealing and possible subsequent delidding and resealing. The teachings of this aforementioned patent are limited in that in order to effectuate high quanlity, high structural strength welds it was necesary to employ the 4047 aluminum alloy. It is highly desirable that the aluminum package be entirely fabricated of 6061 aluminum alloy both for the housing of the electronic package as well as for the cover member. It is, therefore, highly desirable that a method of welding together 6061 aluminum alloy workpieces be found.

A method of laser welding various metals while depositing a material which improves the absorption of the infrared laser radiation is taught by Japanese Patent Application No. 58-65592. The teaching with respect to the welding of aluminum is to utilize iron or nickel as the infrared radiation absorbing material in the weld zone between the workpieces. In another laser welding process taught by Japanese Patent Application No. 59-30492, an aluminum alloy filler is placed between an aluminum base material and an aluminum alloy workpiece. The aluminum alloy filler member between the workpieces differs from the welding base material aluminum alloy. The filler aluminum alloy melts under localized heating as by laser heating and the high temperature strength of the weld is improved by the silicon contained within the filler alloy.

U.S. Pat. No. 4,251,709 teaches a welding process using a localized heating source such as an electron beam welder or a laser, with a jet of liquid metal directed onto the seam or weld area between the workpieces which are welded together. The localized heating means is used to melt the workpiece surface, and subsequent solidification of the liquid metal deposited in the weld area produces a solid metal joint between the workpieces.

SUMMARY OF THE INVENTION

A method of welding together high strength structural aluminum alloy workpieces of the same aluminum alloy, such as 6061 aluminum, is disclosed herein. A selected alloying metal is deposited upon the workpiece in the weld area and the deposited selected alloying metal and the workpiece are locally heated in the weld area to melt same, forming a localized liquid solution of the alloying metal and the workpiece aluminum alloy, and thereafter solidifying the localized liquid solution to form the high strength hermetically sealed weld between the aluminum alloy workpieces.

The process of the present invention is preferably carried out using a conventional laser as the localized heating means with the structual aluminum alloy member of the workpiece being 6061 aluminum. The preferred selected alloying metal for use with 6061 aluminum alloy is silicon which is preferably applied in a finely divided powder form.

DESCRIPTION OF THE PREFERRED EMBODIMENT

Figure 1:
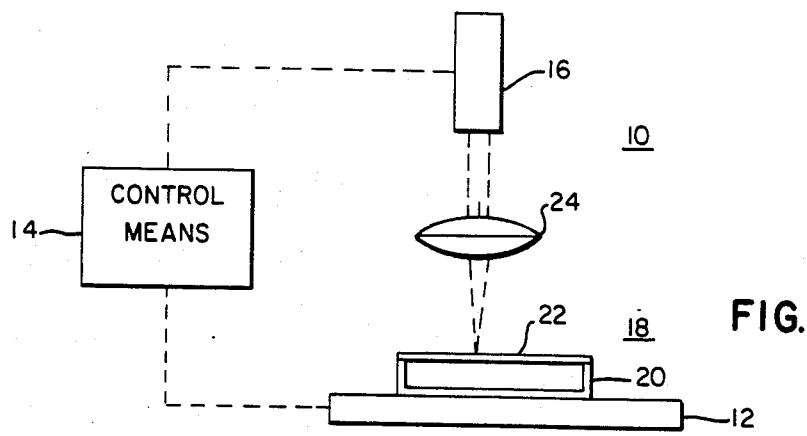
FIG. 1 is a schematic representation of a system for carrying out the method of welding together aluminum alloy workpieces per the present invention.

The invention can be best understood by reference to the drawings. FIG. 1 illustrates in schematic fashion the laser welding system utilized in carrying out the present invention.

The laser welding system 10 comprises a precision XY movable table 12, a control means 14 which is connected to control the XY table 12 and also to control the operation of the laser means 16. The control means 14 can be a numerical control system which coordinates movement of the XY table and operation of the laser means 16 to effectuate and practice the present invention. A means for adjusting the distance between the workpiece and the laser permitting focusing of the laser energy upon the weld region is also provided, not shown here, and can be a manual adjustment means or can be an automated means.

A box-like electronic package 18 is disposed upon the XY table with the package comprising a generally U-shaped housing 20 and a generally planar lid or cover 22 which is to be sealed at its periphery to the package or housing 20. A focusing means 24 illustrated as an optical lens is disposed between the laser means 16 and the workpiece or electronic package 18 for focusing the laser output upon the desired portion of the workpiece which is to be welded. The highly localized laser heating is seen better in FIG. 3 wherein the laser output radiation illustrated by the focused cone 26 is seen impinging a portion of the thin aluminum alloy cover member 22 which is seated upon the upright portion of the housing 20. The housing 20 and the cover member 22 are both structural aluminum alloy members of 6061 aluminum alloy. This 6061 aluminum alloy contains a low silicon content only about 0.6% silicon and it has been impossible in the prior art to consistently weld such 6061 aluminum alloy workpieces together to form a reliable crack-free weld between the members such as for a hermetically sealed electronic package.

Figure 2:
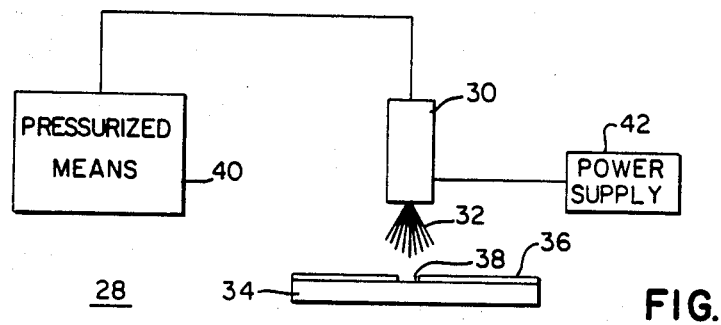
FIG. 2 is a schematic illustration of a system for depositing the selected alloying metal upon the portion of the workpiece in the weld area in practicing the present invention.

FIG. 2 illustrates schematically a system for depositing selected amounts of selected alloying metal upon the aluminum alloy workpiece in the weld area where the members are to be joined together. In FIG. 2, the alloying metal deposition system 28 includes an electrostatic spray gun member 30 from which electrostatically charged finely divided powdered metal of the selected alloying metal is directed as by the emanating lines 32 onto a masked workpiece 34. The workpiece 34 is the aluminum alloy workpiece of 6061 alloy with an insulating masking layer 36 disposed thereon having an aperture 38 therethrough. The aperture 38 is aligned over the portion of the workpiece 34 upon which the selected alloying metal is to be deposited and the spray of electrostatically charged alloying metal passes through the aperture of the masking means 36 and is deposited in a thin layer upon the alloy workpiece 34. The electrostatically spraying system includes the spray gun 30, the pressurized means 40 within which the selected alloying metal provided in finely divided powder form and is carried by the pressurized stream to the spray gun 30. The spray gun 30 is also connected to high-voltage power supply means 42 for applying a high-voltage electrostatic charge to the fluidized powdered alloying member passing from the gun 30 to the workpiece 34. The workpiece 34 is grounded relative to the power supply means 42 which is typically operated at about 90 KV. By way of example, the electrostatic gun member 30 can be Model EHP-502 Powdered Metal Handgun supplied by the DeVilbiss Company, of Toledo, OH.

The selected alloying metal for use with 6061 aluminum alloy workpiece is high purity silicon which in the embodiment of FIG. 2 is deposited as finely divided silicon powder, by way of example, which is 325 mesh size and is deposited to a thickness of about 0.001 to 0.003 inches thick upon the approximately 0.030 inch thick workpiece member 34. By way of example, the finely divided high purity silicon alloying metal is trademarked material SI 244 available from the Atlantic Equipment Division. This finely divided silicon is about 99.5% pure silicon.

The present method can be practiced utilizing a variety of aluminum alloys which are to be welded together. Other aluminum alloys weldable using this method are 5052, 6063, 6070, 6101, 6201 and 6951. The silicon alloying metal provided in the weld area permits effective welding of workpieces of these alloys.

Figure 3:
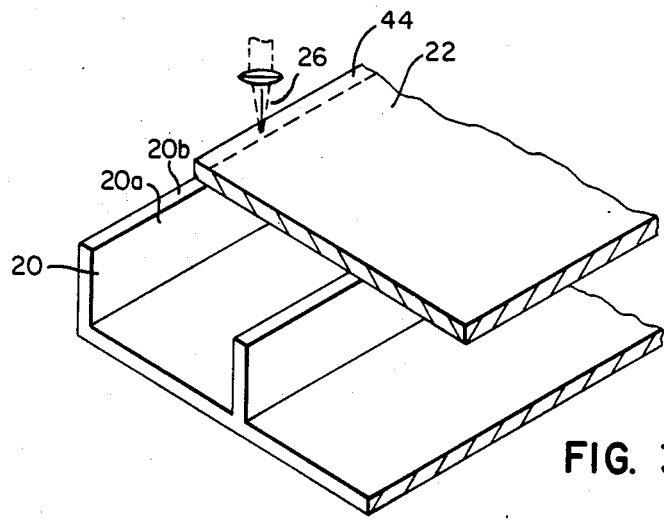
FIG. 3 illustrates in perspective the localized heating of an electronics package cover or lid which is being hermetically sealed to the electronics package housing which is of the same aluminum alloy as the cover or lid.

FIG. 2 illustrates the electrostatic deposition of the selected alloying metal of silicon upon the workpiece 34 and FIG. 3 then illustrates the actual practice of the present invention which involves the localized heatng of the workpiece to effectuate the hermetic seal. In the embodiment seen in FIG. 3 where the lid or cover 22 is to be welded onto the upright portion 20a of the 6061 aluminum housing 20, the finely divided silicon alloying metal can be deposited upon the top surface of the perimeter portion of the cover member 22 in the area that sits atop the extending end portion 20b of the upright portion 20a of the housing 20. The control means 14 coordinates movement of the XY table 12 and of the workpiece 18 situated thereon along with operation of the laser means 16 to move the laser beam 26 along the workpiece areas to be welded. In FIG. 3, the laser beam 26 impacts the alloying metal 44 disposed upon the surface of cover member 22, and the power of the laser beam 26 and movement of the beam across the workpiece is coordinated to locally heat both the cover member 22 and the extending end 20b of the upright portion of the housing to melt both these workpiece aluminum alloys as well as the selected alloying metal silicon deposited upon the cover member forming a localized liquid solution of the alloying metal at the workpiece aluminum alloy interface, and as the laser beam moves along the workpiece, the formerly localized liquid solution area solidifies to form the weld between the aluminum alloy workpieces. This weld between 6061 aluminum alloy workpieces is a hermetically sealed weld free of autogenous cracking as experienced in the prior art when structural aluminum alloy of 6061 was sought to be welded together. By way of example, the laser means can be a pulsed neodymium-yttrium aluminum garnet (YAG) laser which produces output radiation at 1.06 microns and in welding a lid or cover of about 0.03 inches thick to a aluminum housing, the laser was operated at a 4 millisecond pulsewidth at about 18 pulses per second, at a power of about 350 watts with the laser beam being advanced at a speed of about 5 inches per minute along the workpiece.

Another typical structure welded using the method of the present invention is box-like housing much as seen in FIG. 3, but with a peripheral machined step provided in the top surface of the upright portions of the housing, with a drop in planar lid or cover fitting atop the upright portions. The machined step provides a self-fixturing structure for accepting the lid or cover. The silicon alloying metal can be disposed in a notch or groove provided in either the lid edge or the housing upright portion, with the weld being effected between the lid periphery and the housing upright portion.

The depositing of the selected alloying metal upon the workpiece can be carried out as by the electrostatic deposition illustrated in FIG. 2 or by other simple applications of silicon metal as from a slurry upon the workpiece.

The electrostatic deposition of the selected alloying metal of silicon was found particularly advantageous in a high volume manufacturing environment where the electrostatically deposited silicon can be deposited at one work station and then the workpiece moved to a further work station or can be welded at a later point in time with the adherence of the silicon to the workpiece being very good.

Figure 4:
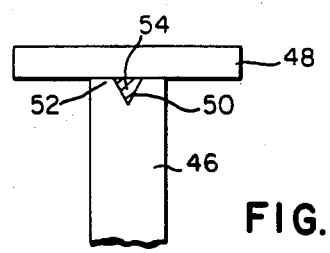
FIG. 4 is a cross-sectional representation illustrating where the selected alloying metal can be deposited in the weld area between two workpieces of the same alluminum alloy.

FIGS. 4 through 7 illustrate a variety of workpiece shapes and areas for depositing the selected alloying metal upon the workpieces. in FIG. 4, for example, the vertically disposed workpiece member 46 has a horizontal workpiece member 48 seated thereon with a V-shaped notch 50 having been machined in the extending end surface 52 of upright member 46. Both of the workpiece members 46 and 48 are 6061 aluminum alloy and high purity finely divided silicon alloying metal 54 is disposed in the notch 50.

In FIG. 5, we again see two aluminum workpieces, the upright piece 46a and the horizontal piece 48a seated upon the upright extending end of workpiece 46a. In this embodiment, the shallow groove 56 has been machined in the top surface 58 of the member 48a. The finely divided silicon powder 60 is disposed in the machined groove 56. The groove depth and the thickness of the silicon alloying metal is again about 0.002 inches thick, with the thickness of the horizontal member 48a being about 0.030.

Figure 5:
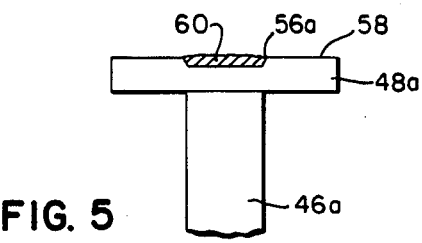
FIG. 5 is another embodiment or showing of where the selected alloying material can be disposed prior to welding together the aluminum alloy workpieces of the same aluminum alloy.

In the embodiment of FIG. 4 and 5, the machined groove or V-shaped notch can be easily filld with a silicon powder containing slurry, and the excess easily wiped away. This is a convenient method of providing a desired amount of the silicon powder in the weld area.

Figure 6:
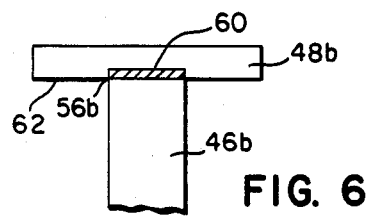
FIG. 6 illustrates in another embodiment yet another location for depositing the selected alloying metal in carrying out the welding together of the aluminum alloy workpieces of the same aluminum alloy.

In yet another embodiment seen in FIG. 6, the vertically extending 46b has a horizontally extending workpiece member 48b seated thereon with a groove 56b having been machined on the underside 62 of the member 48b. The silicon alloying metal 60 is again seen disposed in the machined groove 56b and abuts upon the extending end of the vertical member 46b. In each of these embodiments FIGS. 4, 5 and 6, the focused laser beam would then impinge upon the top surface of the horizontal extending workpiece member over the area where the weld was to be formed where the horizontally extending member seats upon the vertically extending workpiece member. In each case, the laser beam locally heats the workpiece in this weld area to melt the workpiece aluminum alloy of 6061 aluminum and the thin layer of silicon alloying metal forming a localized liquid solution of the alloying metal and the workpiece aluminum alloy. As the laser beam moves along the workpiece, the localized liquid solution is allowed to solidify forming the weld seam between the aluminum alloy workpieces.

The invention has heretofore been described in terms of a laser welding process but other localized heating means, such as an electron beam welding means which can be focused for highly localized heating, can be utilized in carrying out the present invention. Such electron beam welding means requires that the workpiece be contained in an evacuated chamber.

The YAG laser with 1.06 micron output works particularly well as a highly localized heating means in carrying out the method of the present invention, with the 1.06 micron output being readily absorbed by the aluminum alloy workpieces. Lasers which operate at other wavelengths and high power can be utilized provided the laser output reasonably matches the absorption characteristic of the aluminum alloy being welded. For thicker workpieces the higher power conventional lasers can be employed.

Figure 7:
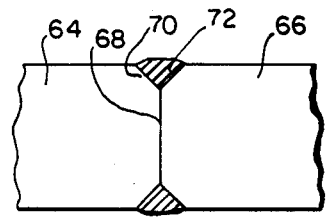
FIG. 7 illustrates the location of the selected alloying metal when butt-welding together two aluminum alloy workpieces of the same alloy.

FIG. 7 illustrates a highly enlarged butt weld between a 6061 aluminum workpiece 64 and a second 6061 aluminum workpiece 66, the ends of which are butted together along interface line 68. Notched corners 70 are provided at the ends of interface line 68 at each end of the workpieces 64 and 66. Finely divided high purity silicon 72 is deposited to fill these notched corner areas 70 as seen in FIG. 7. Localized heating of the workpieces is carried out by directing an appropriate heat source such as a laser or an electron beam upon the silicon and the interface 68 between the workpieces to effectuate melting of the workpiece aluminum alloy and of the silicon and formation of a solid hermetically sealed weld between the aluminum alloy workpieces 64 and 66. In the embodiment localized heating from both sides of the workpiece can be provided by separate lasers.

In the embodiment illustrated in FIG. 2, the selected alloying metal was deposited in an electrostatic process which is easily automated and controlled. It is also possible to deposit or apply the silicon metal directly at the joint interface between the workpiece as a thin layer of silicon. This thin layer of silicon can be coated upon the surfaces of the workpiece by painting a slurry of silicon metal disposed in particulate form in an organic vehicle such as pentance which can be slurried across or painted upon the workpiece areas in the region where the weld is to be formed. In this way, the excess slurry can be wiped away and a thin coating or layer of about 0.02 inch thick silicon powder can be disposed upon the workpiece at the desired location where the weld is to be formed to yield the desired concentration in the melt zone. The alloying metal, such as silicon, can also be vacuum deposited upon the selected workpiece area instead of the electrostatic deposition or slurry coating deposition as described above.

A typical silicon containing slurry which has been utilized in practicing the present invention for depositing the selected silicon alloying metal upon the workpiece comprised isopropyl alcohol or deionized water containing the finely divided silicon and applied as a paster or slurry to the workpiece.

In summary, a method of welding together aluminum alloy workpieces of the same high structural strength aluminum alloy has been detailed which can be utilized for fabrication of a wide variety of structural aluminum members such as the electronic packages and housings used in fabrication of radar electronic systems or of even radar antenna systems. This process permits easy automated manufacturing operation and critical dimensional control of the welding of these workpieces and avoids the need for application of superfluous heat to the workpiece used in other joining techniques which could adversely affect the electronic components which are enclosed within the electronics package or housing.

What is claimed is:
1. Method of welding together aluminum alloy workpieces of the same aluminum alloy comprising:
    (a) selecting the aluminum alloy workpiece alloy from the group of aluminum alloys comprising 6061, 6063, 6070, 6101, 6201, and 6951;
    (b) disposing a selected alloying metal upon at least one of the workpieces in the desired weld area, the selected alloying metal being silicon;
    (c) locally heating the workpieces in the weld area to melt the workpiece aluminum alloy and the silicon alloying metal forming a localized liquid solution of the alloying metal at the workpiece aluminum alloy interface; and
    (d) solidifying the localized liquid solution to form the weld between the aluminum alloy workpieces.
2. The method set forth in claim 1, wherein the local heating of the workpieces is carried out by focusing the output of a laser upon the workpieces in the weld area.
3. The method set forth in claim 1, wherein the silicon alloying metal is finely divided powdered silicon.
4. The method set forth in claim 1, wherein the localized heating is carried out by a neodymium-doped yttrium-aluminum-garnet laser which produces output radiation at about 1.06 microns.
5. The method set forth in claim 1, wherein the selected alloying metal is disposed upon the desired weld area of the workpiece by electrostatic deposition.
6. The method set forth in claim 1, wherein the selected alloying metal is disposed upon the desired weld area by applying a slurry containing finely divided powdered alloying metal.
7. The method set forth in claim 1, wherein a groove or notch is provided in workpiece in the desired weld area, and a slurry containing finely divided powdered selected alloying metal fills the groove or notch.
8. Method of preparing an aluminum alloy member for welding such member to a like aluminum alloy member comprising:
    selectively electrostatically disposing a predetermined amount of high purity, finely divided silicon upon a selected weld area of said aluminum alloy member.
9. The method set forth in claim 8, wherein the like aluminum alloy members are selected from the group of aluminum alloys comprises 6061, 6063, 6070, 6101, 6201 and 6951.
10. Method of laser welding together selected aluminum alloy members of the same aluminum alloy selected from the group of aluminum alloys comprising 6061, 6063, 6070, 6101, 6201, and 6951 comprising:
    (a) depositing a selected alloying metal upon at least one of the aluminum alloy members in the weld area where the members are to be joined, the selected alloying metal being silicon;
    (b) directing a laser beam of energy which is absorbable by the aluminum alloy members upon the aluminum alloy members in the weld area to locally heat the members and the deposited selected alloying metal forming a localized liquid solution of the alloying metal and the aluminum alloy of the members; and
    (c) solidifying the localized liquid solution to form the weld between the aluminum alloy members.
11. The method set forth in claim 10, wherein the silicon alloying metal is provided as finely divided powdered silicon.
12. The method set forth in claim 10, wherein the laser is a neodymium-doped yttrium-aluminum-garnet laser operated in a pulse mode.
13. The method set forth in claim 10, wherein the silicon alloying metal is disposed upon the desired weld area by electrostatic deposition.
14. The method set forth in claim 10, wherein the silicon alloying metal is disposed upon the desired weld area by applying a slurry containing finely divided silicon powder to the workpiece.

* * * * *